May 30, 1944.  R. W. MAY  2,350,058
METHOD AND APPARATUS FOR TESTING THE POROSITY OF SHEET MATERIALS
Filed Dec. 23, 1940  2 Sheets-Sheet 1
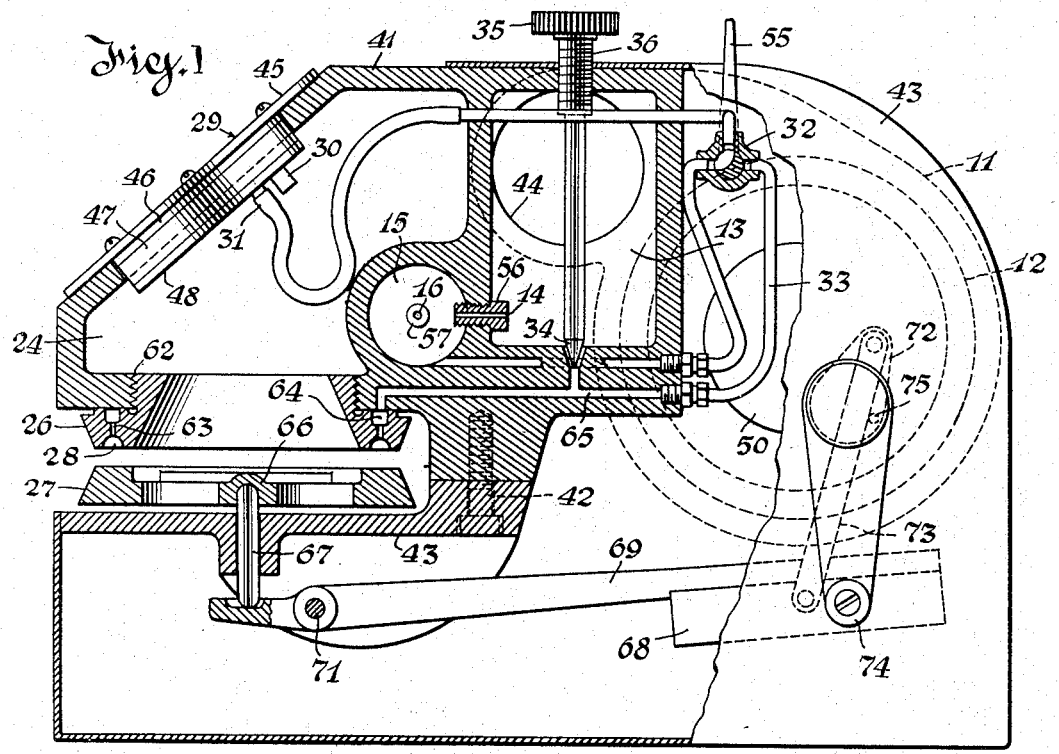
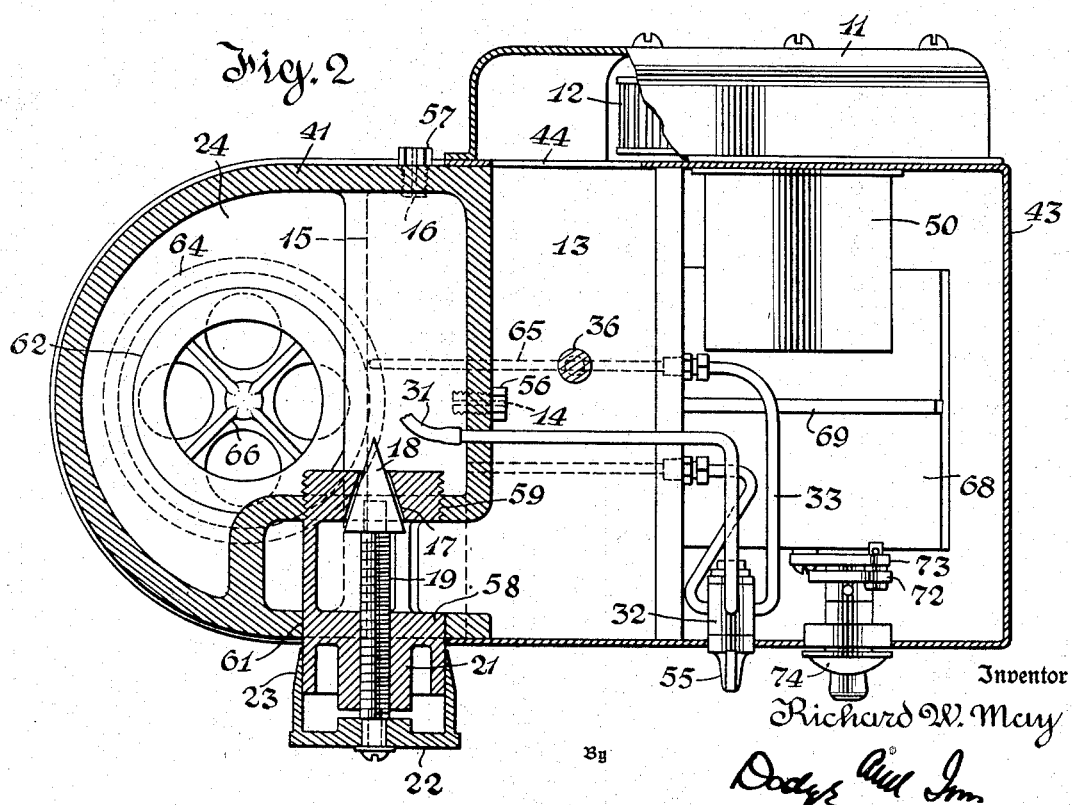
Inventor
Richard W. May
By Dodge and Sun
Attorneys May 30, 1944.  R. W. MAY  2,350,058
METHOD AND APPARATUS FOR TESTING THE POROSITY OF SHEET MATERIALS
Filed Dec. 23, 1940   2 Sheets-Sheet 2
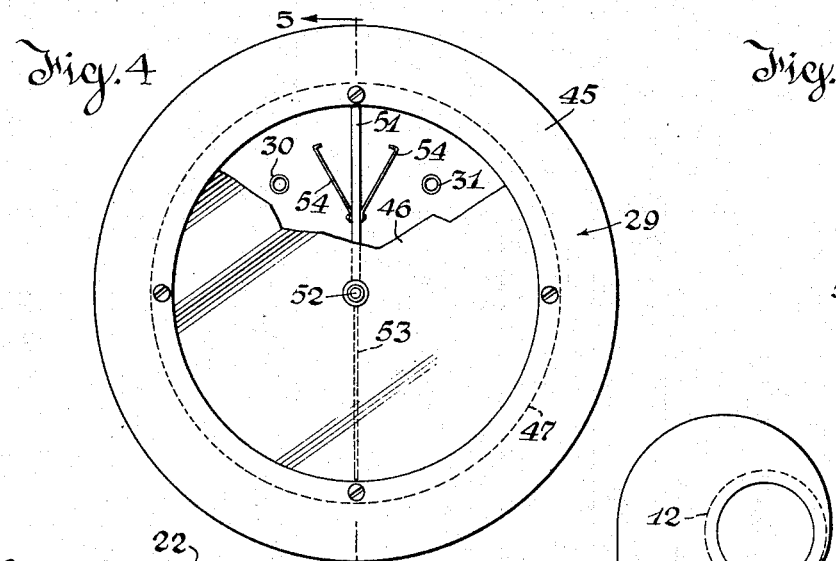
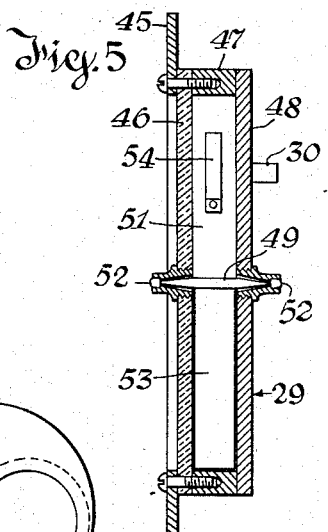
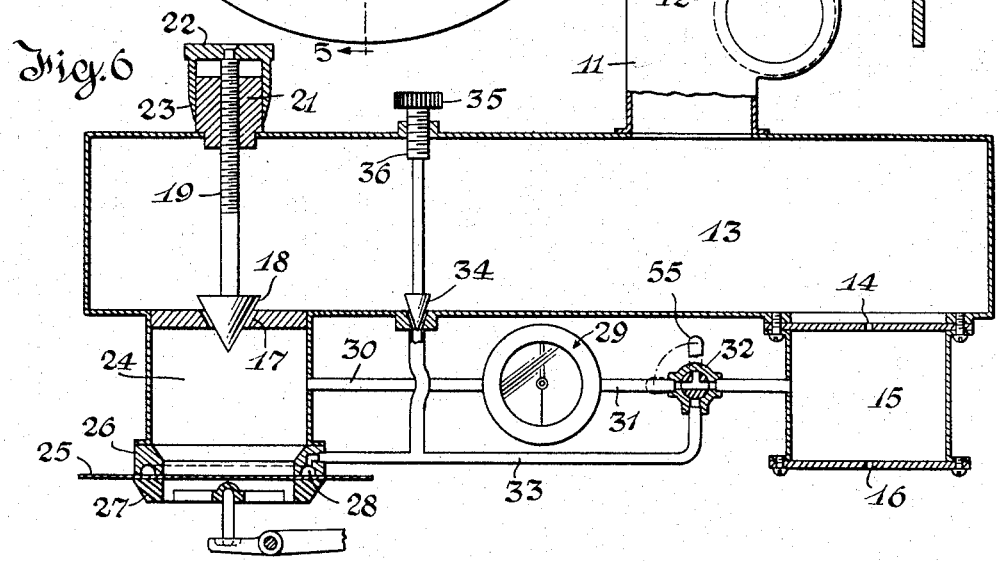
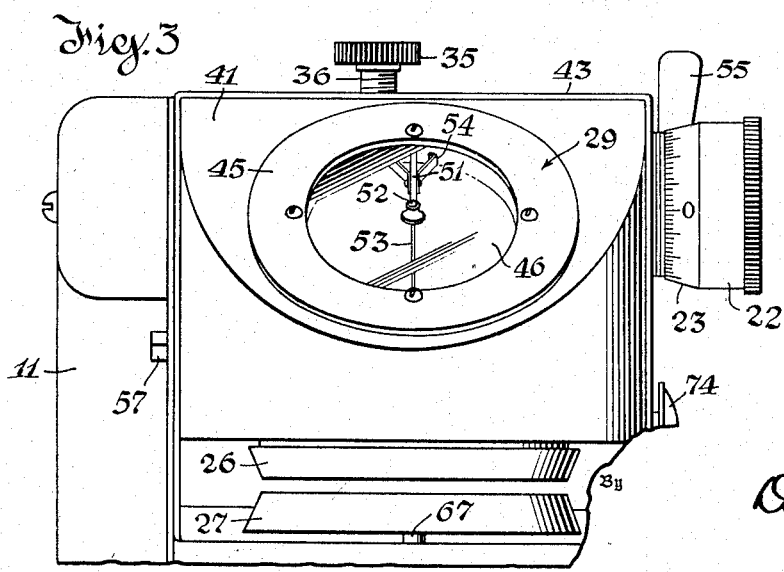
Inventor
Richard W. May
Attorneys Patented May 30, 1944

2,350,058

UNITED STATES PATENT OFFICE 2,350,058

METHOD AND APPARATUS FOR TESTING THE POROSITY OF SHEET MATERIALS

Richard W. May, Pittsfield, Mass., assignor to W. & L. E. Gurley, Troy, N. Y., a corporation of New York Application December 23, 1940, Serial No. 371,462

6 Claims. (Cl. 73—51)

This invention relates to testing devices and particularly to devices for testing the porosity of sheet materials such, for example, as paper, felt, and textile fabrics. As will appear, any porous sheet material may be tested with the device.

The usual procedure to determine porosity has been to measure the time required to force a definite volume of air through a definite area of the sheet material under a maintained standard pressure. The patent to Egy 1,905,270, April 25, 1933, shows a typical device for making tests of this character.

Test apparatus of the character just mentioned has been quite extensively used because of its simplicity and because better methods have not been available. The results of its use are not entirely satisfactory because indeterminate errors may be caused by friction and by variations of physical quantities, such as temperature, humidity, and atmospheric pressure. These errors being not determinable cannot be corrected. Moreover, accurate measurement of elapsed time is difficult where the interval is short. Hence the probable error increases as porosity increases because the time interval becomes shorter as porosity increases.

The present invention offers a method and apparatus which does not involve the determination of elapsed time and which affords sustained conditions under which precise setting of the device is possible. The method substantially eliminates the disturbing effects of variations of physical conditions which, as stated above, impair the action of prior art devices.

Generally stated, the method according to the best known procedure involves the establishment of two confined flow paths from a single source of air under a moderate sustained pressure to the same space maintained at a lower sustained pressure. As a practical matter the discharge is to atmosphere. One flow path is through two standard orifices arranged in series. This gives what may be called a standard pressure intermediate the orifices. The other flow path is serially through a definite area of sheet material (the sample) and through an adjustable orifice. Preferably, the second flow is first through the adjustable orifice and then through the sample, because this facilitates the mounting of the sample in the device. Except for mechanical difficulties in mounting the sample, the flow could be first through the sample and then through the adjustable orifice. While flow is occurring through both paths, the adjustable orifice is varied until the pressure intermediate the adjustable orifice and the sample exactly equals the standard pressure intermediate the two standardized orifices.

The adjustment of the adjustable orifice is made by axially shifting a right conical valve relatively to a similar and concentric right conical seat to vary the effective area of the annular interval between the valve and the seat. The pressure equalizing adjustment of the valve, therefore, is a function of the porosity, or flow capacity, of the sample and may be read on a suitably graduated scale. The use of an elongated conical valve in conjunction with an elongated conical seat is a convenient way of securing gradual adjustment through a satisfactorily long range of valve movement.

Since both flow paths are subject to the same head pressure and the same back pressure and since the intermediate pressures are equal during the test, variations of head pressure and of back pressure, as well as variations of temperature, humidity, and similar physical quantities affect the flow through both paths in the same sense and in approximately the same degree. Hence they introduce no serious error in the final result. It is thus possible to develop the head pressure by using a motor driven rotary fan without precise control of fan speed.

The apparatus is simple, and its manipulation requires no special precautions. Because the conditions of test are sustained, ample opportunity is afforded for accurate setting of the adjustable orifice valve. In consequence, use of the test device is easy and accuracy of the device is approximately uniform over its entire range.

The advantage of the method is that it affords more reliable comparative data because there is inherent consistency as to the performance of any given instrument and as to the performance of different instruments of the same design. The attainment of absolute quantitative measurements is not sought. On the contrary, the device offers, in a more accurate degree and in a more facile manner, essentially the same result as was sought by use of the prior art devices. The device may be calibrated in various ways, as will be explained.

In any sheet testing device in which the sheet is clamped and subjected to pneumatic pressure, there is a tendency for leakage to occur along the surface of the sheet and this leakage if allowed to occur would affect the accuracy of the determination of porosity. It has therefore been proposed to provide the sheet clamping means with an annular groove in the clamping surface, the air in the groove being maintained under a pressure equal to the head pressure which causes such leakage.

An incidental feature of the present invention is the provision of means for developing an adjustable air pressure in a groove in the clamping surface and connections providing for the comparison of that pressure with the head pressure which causes the leakage, by the use of the same differential pressure indicator which at other times is used in the determination of porosity.

The invention will now be described with reference to the accompanying drawings which illustrate a preferred embodiment of the invention which is completely portable and self-contained.

In the drawings:

Figure 1 is a view partly in elevation and partly in vertical axial section of the machine. In this view and for the purpose of indicating various flow paths on a single view, certain ports which are not actually on the plane of section are drawn as if they were on that plane, so that flows may be traced.

Fig. 2 is a plan view of the device, the view being partly sectional. This view indicates the location of the ports mentioned in the description of Fig. 1.

Fig. 3 is a fragmentary front elevation of the device.

Fig. 4 is a face view of the differential pressure indicator.

Fig. 5 is a section on the line 5—5 of Fig. 4.

Fig. 6 is a diagrammatic view chiefly in section indicating the various flow paths which are characteristic of the device.

To facilitate an understanding of the principle of operation reference will first be made to the diagrammatic showing in Fig. 6. In this figure, 11 represents the housing of a blower whose runner is indicated by dotted lines at 12. This blower is driven by any suitable means, such as an electric motor (not shown in Fig. 6), and discharges into a chamber 13 which is the head pressure chamber. Since the consumption of air is small, the pressure in the chamber 13 will be substantially uniform if the runner 12 is driven at approximately uniform speed. Substantial uniformity is all that is required.

Leading from the chamber 13 is a supply orifice 14 which delivers air to a standard pressure chamber 15 which is vented to atmosphere by way of a fixed orifice 16. This is the so-called standard flow path.

Also leading from the head pressure chamber 13 is a conical orifice 17 whose capacity is controlled by a conical valve 18. This valve is mounted on a stem which has threads 19 which fit closely in a threaded guideway 21 fixed in the opposite wall of the housing enclosing the chamber 13. The stem 19 has a cap 22 which has a graduated sleeve-like extension 23.

The port 17 leads to a test chamber 24 from which flow can occur only through a fixed area of a sheet 25 of the material undergoing test. This sheet is clamped between an annulus 26, which is mounted at the lower extremity of the housing enclosing chamber 24, and a movable clamping annulus 27, which is of the same internal diameter and which is concentric with the annulus 26. The annulus 27 is suitably supported in a manner which will be made clear in connection with the commercial embodiment of the invention. For present purposes it will suffice to say that the clamping pressure between the annuli 26 and 27 is limited to a uniform value which, for practical purposes, would be about fifty pounds. Thus the test flow path is through orifice 17, chamber 24 and sample 25.

In the clamping face of fixed annulus 26 there is a groove 28 which is the groove to be maintained at the same pressure as exists within the chamber 24. With the runner 12 operating to develop pressure in the chamber 13 and with the sample 25 clamped in place, the operation is to adjust the valve 18 until the pressure developed in the chamber 24 is equal with the pressure developed in the chamber 15. To accomplish this result it is necessary to make use of some form of differential pressure gauge responsive to the difference of pressure between the two chambers and capable of indicating equality of pressure between the chambers. The device must be sensitive.

An inclined U-manometer tube containing a liquid and having its respective branches connected with the two chambers has been used on a laboratory scale in the development of the present invention but is not suitable for use in portable instruments. Therefore use is made of a specially designed differential pressure indicator whose construction will hereafter be described in detail. This indicator is designated generally in Fig. 6 by the numeral 29.

To it two pressure connections are made. One pressure connection 30 is in free and constant communication with the chamber 24. The other pressure connection 31 leads to a three-way valve 32 which may be set to establish communication between the connection 31 on the one hand, and either the chamber 15 or the connection 33 which leads to the groove 28.

A small conical valve 34, adjustable by the knob 35, which is connected to a threaded stem 36 on which the valve 34 is mounted, controls the delivery of air from the head pressure chamber 13 to the connection 33. This air escapes radially through the sample.

With the three-way valve 32 in the position shown, so that the differential gauge 29 is subject to the pressure differential between chambers 24 and 15, the sample 25 is mounted and the runner 12 is started. The valve 18 is then adjusted until the pressure differential is zero. Then the valve 32 is shifted to connect the differential pressure gauge between the chamber 24 and the groove 28. The valve 34 is then adjusted to establish a zero differential. Then the valve 32 is returned to the position shown in Fig. 2 and any corrective adjustment of the valve 18 which may be necessary to establish equilibrium of pressures between chambers 24 and 15 is made. If any material readjustment of the valve 18 is necessary, it may be desirable to make a further adjustment of the valve 34 by repeating the operations already described. The purpose is to establish in the groove 28 a pressure which is precisely equal to the pressure in the chamber 24 at the time that the valve 18 is set to establish equality between the chambers 24 and 15. This result can readily be attained.

The creation of pressure equality between groove 28 and chamber 24 inhibits leakage outward along the sample from the chamber 24. There is, however, leakage outward from the groove 28 which is exactly compensated by flow through valve 34.

It is considered desirable to equalize the pressure in the groove 28 with the pressure in the chamber 24, rather than to establish equality between the groove 28 and the chamber 15, because a direct test of pressure equalization is thus made. It must be remembered, however, that during the test the pressures in the chambers 24 and 15 are equal, so that theoretically at least, equalization of pressure in groove 28 with the pressure in the chamber 15 would establish the desired condition. Insofar as the inventive aspect of control of pressure in the groove 28 is concerned, the important thing is that the differential gauge 29 forming part of the device can be used alternatively for making the desired check on the pressure in the groove 28.

Fig. 6 gives a simple diagrammatic representation of the elements of the commercial device shown in the other figures. In the ensuing description of the commercial device components which have been identified on Fig. 6 will be given the same reference numerals in Figs. 1 to 5 which show the commercial embodiment of the same device.

Refer now to Figs. 1 to 5. There is a main casting 41 which is cored and drilled to provide the chambers and passages identified in Fig. 6. Fastened to the lower portion of this casting by screws, indicated in dotted lines at 42, is a bracket casting 43 which guides the lower sample clamping annulus 27 and supports the actuating mechanism thereof. The two castings are connected to and partly enclosed and supported by the sheet metal housing 43 whose form is clearly indicated in the drawings.

The fan housing 11 is fastened to the left side of the sheet metal housing 43 and the fan discharges through a passage 44 directly into the chamber 13 which extends transversely across the casting 41 the full width of this casting. See Fig. 2.

The runner 12 of the fan, a portion of which appears in Fig. 2, is driven by an electric motor 50 which is enclosed within the sheet metal housing 43 to the rear of the casting 41. Forward of the chamber 13 is the chamber 24, the casting being provided with an inclined surface at its front with a circular aperture in which the differential pressure gauge 29 is mounted. The differential pressure gauge is supported by a flange ring 45 and includes an air-tight cylindrical casing mounted to the rear of the ring 45 and made up of a transparent front plate 46, an annular rim 47 and a back plate 48. (See Fig. 5.) Extending radially from the top of the indicator to the pivot 49 is a partition 51. The pivot 49 is mounted at its opposite ends in jeweled bearings 52, the forward one of which is mounted at the center of the transparent plate 46 and the rear one of which is mounted at the center of the plate 48. Carried by the pivot member 49 is a light weight radially extending vane 53. Thus the vane and the partition 51 approximately isolate from each other the right and left hand portions of the space within the indicator casing. A pair of light leaf springs 54 are provided to arrest without shock any overthrow of the vane 53.

The connection 30 to the chamber 24 is simply an open-ended tube which leads through the back plate 48 and is in free communication with the chamber 24. The connection 31 which leads to the three-way valve 32 may comprise sections of tubing, the forward one of which is flexible, as indicated in Fig. 1. The three-way valve 32 is mounted at the rear of the casting 41 and is actuated by a handle 55 on the right hand side of the device. (See Fig. 2.) The chamber 15 is cored in the casting 41 and the entrance orifice 14 is formed in a threaded plug 56 which is screwed into a tapped hole drilled in the partition between the chambers 13 and 15. The vent port 16 which leads to atmosphere from the chamber 15 is formed in a similar screw plug 57. (See Figs. 1 and 2.)

The valve 18 with its stem 19, actuating-head 22 and graduated flange 23 is mounted in a cage 58 which is threaded at 59 in an aperture at the right side of casting 41. Cage 58 is laterally ported to admit air to the valve and the threaded joint 59 is an air-tight joint so that no leakage through this joint will occur from between the chambers 13 and 24. The joint with the outer wall indicated at 61 need only be reasonably tight because moderate leakage from the chamber 13 to atmosphere, if it occurred, would not cause difficulty. The valve cage 58 is mounted in a forward extension of the chamber 13, as clearly shown in Fig. 2. The construction can readily be understood from the drawings.

The upper clamping ring 26 is threaded at 62 into an aperture in the overhanging lower face of the casting 41. This aperture communicates directly with the chamber 24. In the lower face of the ring 26 is the groove 28 which in the actual construction communicates by passages 63 with another groove 64. This is sealed by contact of ring 26 with casting 41 and communicates with the drilled port 65 which forms a part of the connection 33 above described.

The valve 34 is formed on the end of a stem which is threaded at 36 in the top of the casting 41. The valve is operated by the knob 35.

The lower clamping ring 27 is supported by a spider 66 which is sustained at its center on a vertical sliding stem 67. This stem is guided in the casting 43. It is urged upward by a weight 68 which is carried on the longer arm of a lever 69 pivoted to the casting 43 at 71. The shorter arm of the lever 69 reacts upwardly on the stem 67. A weight 68 develops the desired force reaction (50 pounds) between the ring 27 and the ring 26.

To elevate the weight 68 a crank arm 72 is used. This is connected with the weight by a link 73 and may be turned by external hand crank 74 mounted on the right-hand side of the machine. A stop pin 75 on the crank 72 arrests the link 73 just after it has swung past center. Thus when the crank 74 is turned clockwise to the limit of its motion to elevate the weight 68, it is retained by the downward pull of the weight. To engage the clamp the crank need only be turned a short distance in a counter-clockwise direction and released.

To avoid complicating the drawings the control switch and the electric connections for the motor are omitted since they are conventional and may be variously located. The differential indicator might be replaced by any equivalent mechanism of sufficient sensitivity. The vane 53 is fitted with a very slight clearance between it and the cover plate 46, back plate 48, and peripheral member 47. The jewel pivot bearings resemble those used in magnetic compasses.

Slight leakage past the vane occurs and is a factor in the sensitive response of the device. It must be remembered that flow occurs continuously through the chambers 15 and 24 and that the sensitive vane 53 responds to the sightest tendency for cross flow between the chambers to take place.

While this particular indicator is preferred because of its sensitivity and because it renders the device completely portable, it must be understood that so far as the broad aspects of the invention are concerned any sensitive means for indicating pressure differentials might be substituted.

There is no absolute unit of porosity and the sleeve 23 might be graduated in almost any preferred manner. The arrangement of the graduations is illustrated in Fig. 5 and resembles that used on micrometer calipers. The particular units adopted are not a feature of the invention but after one machine has been graduated and accepted as a standard it is possible to construct duplicates and calibrate them by comparison. For example, a series of orifice plates covering the entire range of the instrument might be constructed and might be inserted in the machine in lieu of the sample for calibration purposes. Such a series might be adopted as the basis of a reproducible standard.

The invention has so far been described as used in what is conceived to be the best way of applying the inventive principle, but that principle is broader than the particular arrangement described. Brief discussion of controlling factors will explain their importance.

The location of the adjustable orifice (valve) in advance of the sample is the best known arrangement. The chief reason for preferring this sequence is that it locates the sample-mounting clamps at the end of the flow path and thus renders them accessible and consequently easier to construct and to manipulate. It is practicable so far as the principle of operation is concerned to reverse the sequence so that the flow is first through the sample and then through the adjustable orifice (valve). In such case the graduations which indicate porosity by indicating valve adjustment would be appropriately modified. The device would still retain the desirable characteristic that the standard path includes the two fixed orifices and the sample and adjustable orifice are both in the test path. Adherence to this arrangement gives better range and accuracy because it offers an approximately stable intermediate standard pressure.

Thus, while the particular arrangement described in detail is preferred for substantial reasons, the invention is broader and its scope is defined by the claims.

What is claimed is:

1. The method of determining the porosity of sheet material, which comprises causing a gaseous medium to flow from a source at an approximately uniform maintained pressure to a discharge at a lower maintained pressure through two distinct confined paths, the flow in one path being serially through two flow restricting orifices, whereby an intermediate reference pressure is established between the orifices, and the flow in the other path being serially through two restrictions, one of which is a definite area of the sheet material and the other of which is a variable orifice, whereby a variable intermediate test pressure is established between the sheet material and the variable orifice; adjusting the flow capacity of said variable orifice until the intermediate test pressure equals the intermediate reference pressure; and expressing porosity in terms of the adjustment of the variable orifice.

2. The method of determining the porosity of sheet material, which comprises causing a gaseous medium to flow from a source at an approximately uniform maintained pressure to a discharge at a lower maintained pressure in two distinct confined paths, one path being in series through two flow restricting orifices whereby an intermediate reference pressure is established between the orifices, and the other flow path being serially through a third orifice and then through a sample comprising a definite area of the sheet material, whereby an intermediate test pressure is established between the sample and the orifice; variably throttling the flow through the third orifice until said intermediate test pressure equals the intermediate reference pressure; and expressing porosity in terms of such variable throttling.

3. The combination of a supply header; means for maintaining a substantially uniform elevated air pressure therein; means forming a confined reference flow path interposed between said header and atmosphere and comprising two flow restrictors arranged in series and an intervening reference chamber; means forming a confined test flow path interposed between said header and atmosphere comprising an adjustable inlet valve, a test chamber to which said valve admits air from the supply chamber and means for sealing a porous sheet to be tested over an orifice of definite area between said test chamber and atmosphere; means for indicating the adjustment of said inlet valve; and means for indicating the existence of a pressure differential between said reference and test chambers.

4. The combination of a supply header; means for maintaining a substantially uniform elevated air pressure therein; means forming a confined reference flow path interposed between said header and atmosphere and comprising two flow restrictors arranged in series and an intervening reference chamber; means forming a confined test flow path interposed between said header and atmosphere comprising an adjustable inlet valve, a test chamber to which said valve admits air from the supply chamber and means for sealing a porous sheet to be tested over an orifice of definite area between said test chamber and atmosphere, said sealing means including a clamp having a leakage-neutralizing channel; adjustable valve means for supplying air from said header to said channel; a differential-pressure indicator; and shiftable valve means for connecting said indicator selectively between the test and reference chambers and between said channel and one of said chambers.

5. The combination of a supply header; means for maintaining a substantially uniform elevated air pressure therein; means forming a confined reference flow path interposed between said header and atmosphere and comprising two flow restrictors arranged in series and an intervening reference chamber; means forming a confined test flow path interposed between said header and atmosphere comprising an adjustable inlet valve, a test chamber to which said valve admits air from the supply chamber and means for sealing a porous sheet to be tested over an orifice of definite area between said test chamber and atmosphere, said sealing means including a clamp having a leakage-neutralizing channel; adjustable valve means for supplying air from said header to said channel; a differential-pressure indicator; and shiftable valve means for connecting said indicator selectively between the test and reference chambers and between said channel and said test chamber.

6. In a device for measuring the porosity of sheet material, the combination of means for maintaining a pressure differential between a pneumatic head pressure and a lower pneumatic discharge pressure; duct means for establishing two distinct paths supplied at said head pressure and discharging against said discharge pressure, one such duct means comprising two spaced flow restricting ports arranged in series with an intervening chamber, and the other such duct means comprising an adjustable valve and means for clamping porous sheet material to be tested across a passage of definite area, said valve and passage being spaced apart in series to afford a second intervening chamber; means for indicating equality of the pneumatic pressures in said two chambers; and means for indicating the adjustment of said valve.

RICHARD W. MAY.